United States Patent [19]

McGehee

[11] 3,951,056

[45] Apr. 20, 1976

[54] PORTABLE PECAN CLEANER

[76] Inventor: Roger N. McGehee, Star Rte., San Saba, Tex. 76877

[22] Filed: Feb. 26, 1974

[21] Appl. No.: 446,025

[52] U.S. Cl. .................................. 99/569; 99/575
[51] Int. Cl.² ...................... A23N 5/00; A23N 7/00
[58] Field of Search ............ 99/569, 568, 571, 577, 99/578, 580, 581, 582

[56] References Cited
UNITED STATES PATENTS

| 611,765 | 10/1898 | Beach | 99/568 X |
|---|---|---|---|
| 1,230,001 | 6/1917 | Martenette | 99/569 X |
| 1,297,497 | 3/1919 | Rosenthal | 99/568 X |
| 1,320,968 | 11/1919 | Baudendistal | 99/577 X |
| 1,791,362 | 2/1931 | Forge | 99/568 X |
| 2,279,987 | 4/1942 | Guerra | 99/569 |
| 2,808,056 | 10/1957 | Scheel et al. | 99/571 X |

Primary Examiner—Stanley N. Gilreath
Assistant Examiner—Donald B. Massenberg
Attorney, Agent, or Firm—Clarence A. O'Brien; Harvey B. Jacobson

[57] ABSTRACT

A portable machine incorporating a first chamber in which pecans are subjected to drum mounted resilient flails which cooperate with a roughened chamber portion in effecting a separation of the husks or hulls of the pecans. A second chamber located outward of the first chamber receives the pecans, hulls and other vegetation which might have been gathered with the pecans with all of the materials in the second chamber being subjected to a separating flow of air whereby the normally heavier pecans are allowed to pass therethrough with the lighter hulls and other materials being air separated from the pecans.

4 Claims, 6 Drawing Figures

Fig. 4
Fig. 6
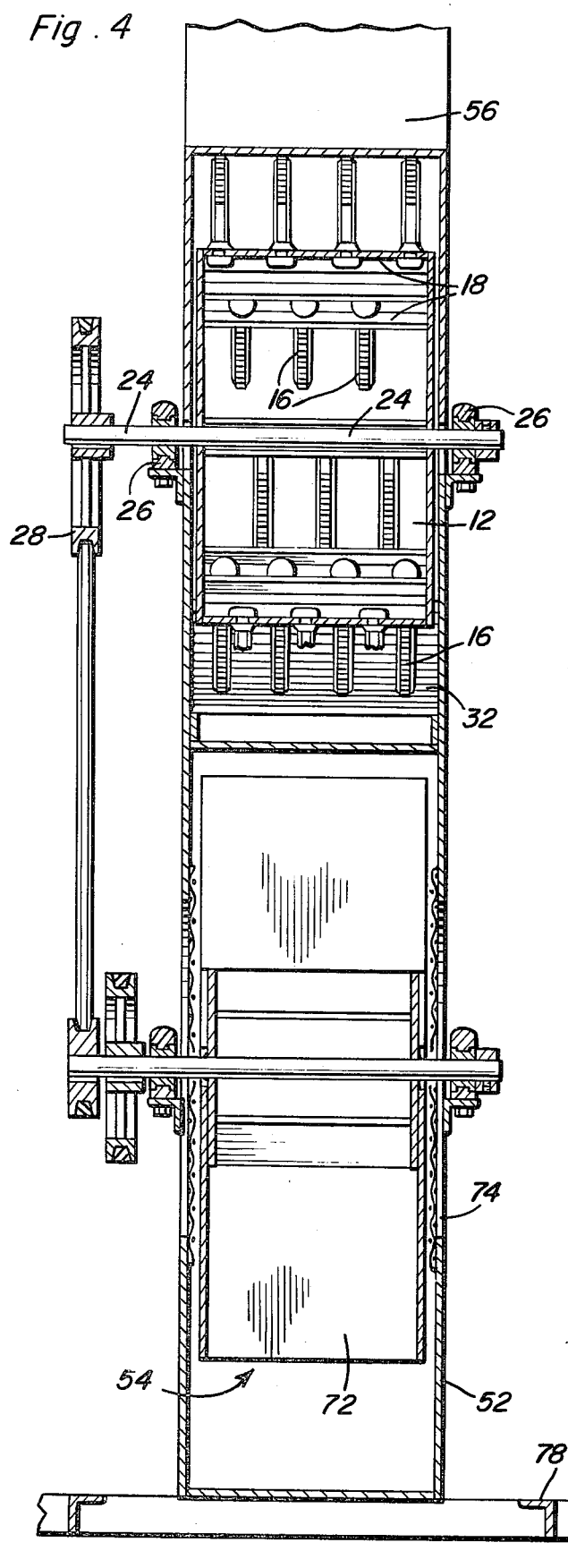
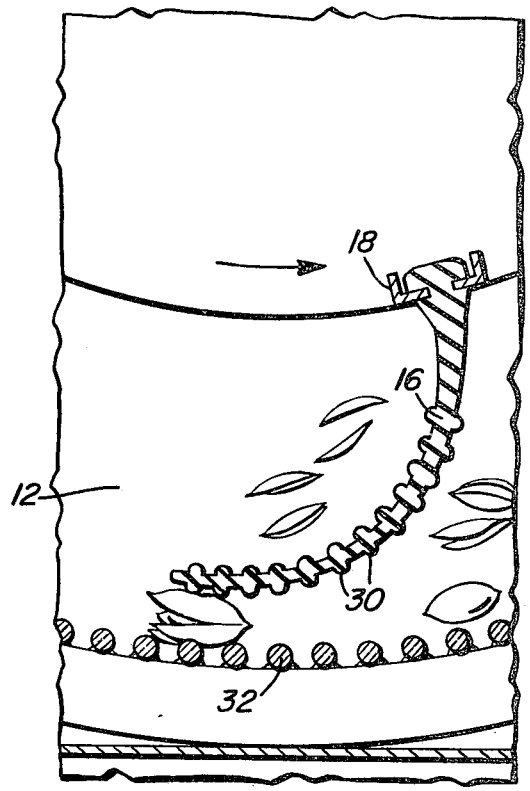
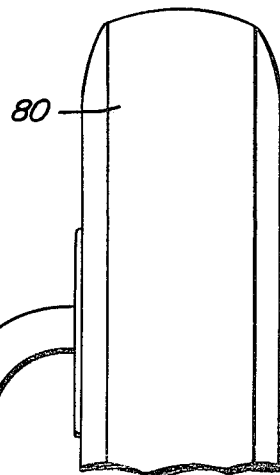

PORTABLE PECAN CLEANER

The present invention is generally related to the harvesting of pecans, and more specifically to a unique portable machine for hulling and otherwise cleaning pecans.

It is a primary object of the invention to provide a compact highly practical cleaning apparatus which can be easily utilized directly in the field, the machine being self-contained and mounted on a towable chassis.

Also of significance is the fact that the cleaner utilizes a minimum of operating components, notwithstanding its efficiency in hulling or husking pecans and effectively separating the pecans from any debris which might have been gathered therewith during the picking operation.

Likewise, it is considered a significant object of the invention to provide a pecan cleaner which can be economically manufactured putting it well within the reach of small farmers.

In achieving these various objects, the machine of the instant invention includes a hulling chamber housing a rotating drum mounting a series of flails or flexible fingers which forcibly engage the introduced pecans against and along a roughened grate in a manner so as to effect a removal of the husks or hulls therefrom without damage to the pecan itself. The pecans are then discharged, through the rotating action of the drum, into a separating chamber where the pecans and any associated debris are subjected to a forceful updraft sufficient so as to upwardly eject the stripped hulls and debris while allowing the heavier pecans to pass through and discharge outwardly of the machine. The blower is housed below the hulling chamber and separating chamber so as to provide for a compact assembly. In addition, all of the operating components are mounted on a wheeled chassis for transport of the machine as desired.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 4 is a transverse cross-sectional view taken substantially on a plane passing along line 4—4 in FIG. 3;

FIG. 6 is an enlarged detail illustrating the hulling action of a flail and the grate.

Figure 1:
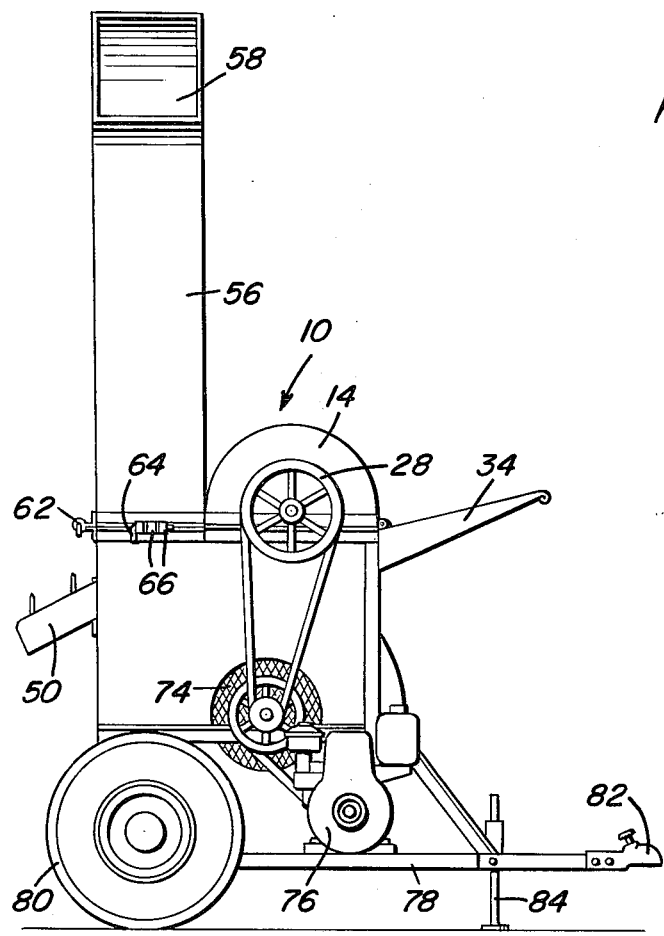
FIG. 1 is a side elevational view of the portable pecan cleaner.

Referring now more specifically to the drawings, reference numeral 10 is used to generally designate the portable pecan cleaner comprising the present invention. This machine 10 includes a first chamber 12, defined within a circular housing 14, wherein the pecans are subjected to the action of a plurality of flails or resilient fingers 16 which are so designed as to effect a removal of the husks or hulls from the introduced pecans.

The flails 16 are mounted on channel-shaped crossbars 18 which, in conjunction with a pair of circular end plates 20 to which the crossbars 18 are attached, define a drum 22 mounted coaxially within the chamber 12. This drum 22 is fixed to a central shaft 24, the opposite ends of which project through the opposed end walls of the housing 14 and rotatably mount within appropriate bearing blocks 26. As will be appreciated from FIG. 4 in particular, one end of the shaft 24 mounts an appropriate pulley 28 for a driving thereof as shall be discussed subsequently.

Each of the flails tapers from a thickened crossbar mounted inner end to a relatively thin flexible outer portion with the major portion of the length of the flails 16 having a series of nubs 30 projecting from the opposed sides thereof. These nubs assist in gripping and turning the material in a manner so as to effect a removal of the husks or hulls.

Figure 3:
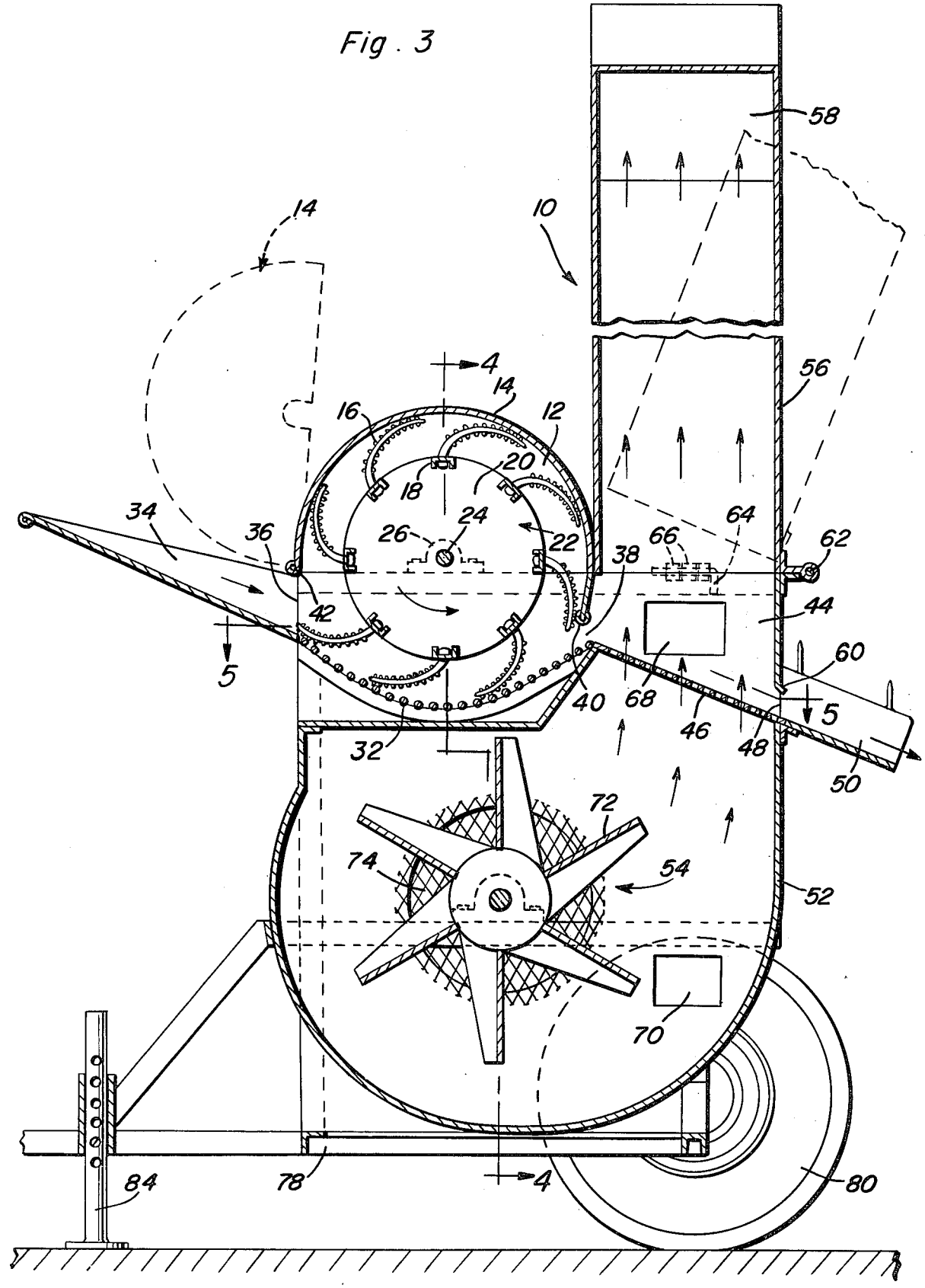
FIG. 3 is an enlarged vertical cross-sectional view taken substantially on a plane passing along line 3—3 in FIG. 2.

As will be noted from the drawings, the flails or fingers 16 project radially outward from the drum and are of a length so as to wipe or drag along the chamber wall, flexing rearwardly as the drum rotates in the direction indicated by the arrows in FIGS. 3 and 6. In this manner, the introduced pecans are rolled and tumbled along the lower portion of the chamber 12 as they travel therethrough under the moving force of the flails 16. In order to enhance the tumbling and hulling action, the lower arcuate portion of the housing 14 is formed in the nature of a grate 32. This grate preferably being formed of closely spaced round rods which, while tumbling and enhancing the hulling action of the flails, will do so in a manner which will not damage the pecans.

The introduction of the harvested pecans to the hulling chamber 12 is effected by means of an inlet chute 34 leading to an open inlet 36 provided in the outer periphery of the housing 14 so orientated as to direct the pecans into the lower portion of the chamber 12 in the direction of rotation of the drum 22 whereby the introduced pecans are impelled along the lower grate portion of the chamber 12 to an outlet 38 generally opposed from the inlet 36.

The flails 16, as they move the pecans, hulls, and the like toward the outlet 38, will tend to unflex and propel the materials through the outlet 38 with the flails 16 then contacting the smoothly rounded upper edge 40 of the outlet. This action tends to insure a proper discharge of all of the material through the outlet 38 without a carrying of any of the material through the upper portion of the chamber 12. The flexing of the flails or fingers 16 about the upper portion of the chamber 12 tends to have a cleaning efect thereon as the flails are moved into position for reception of the uncleaned pecans through the inlet 36. Should periodic cleanings of the interior of the hulling chamber 12 be necessary, or for any servicing thereof which may be required, the upper portion of the housing 14 is hingedly mounted as at 42 for a selective upward and outward swinging thereof as indicated in phantom lines.

The outlet 38 leads directly into the separation chamber 44 which is of the same width as the hulling chamber 12 with the outlet 38 extending the full width thereof for a complete discharge from the hulling chamber 12 into the separation chamber 44. The bottom wall of the separation chamber 44 is formed by a perforated plate or screen 46 which slopes downwardly and outwardly through a discharge opening 48 to a discharge chute 50.

An enlarged blower housing 52 and blower assembly 54 is mounted under the hulling chamber 12 and separating chamber 44 with the blower assembly 54 effecting a forceful upward movement of air through the perforated plate 46 and into the separation chamber 44. A vertical stack 56 provides a full area elongated vertical continuation of the separation chamber 44 upwardly to and through a laterally directed exhaust opening 58. Structured in this manner, the normally heavier hulled pecans will move through the separation chamber 44 down the inclined perforated plate or screen 46 to the discharge chute 50. At the same time, the forceful upwardly directed flow of air will lift the lighter hulls or husks, as well as any other twigs, leaves, or the like and float such debris through the stack and out the exhaust opening 58. It is contemplated that the stack 56 be of a substantial height whereby should there be any tendency for the pecans to lift slightly under the force of the flowing air, such will not discharge through the exhaust opening 58. Incidentally, it will be noted that the upper lip 60 of the separation chamber discharge opening is slightly outwardly and downwardly flared. In this manner, the flow of air adjacent the discharge opening 48 is inwardly directed against the outward movement of the pecans. This in turn tends to preclude any discharge of debris through the discharge opening 48.

As indicated in FIG. 3, the stack 56 can be pivotally or hingedly mounted as at 62 for an outward swinging thereof for maintenance purposes. The stack 56, when in operative position, is retained by a lock rod 64 through aligned pipe sections 66 alternatively affixed to the lower end of the stack 56 and the upper edge of the separation chamber 44. In addition, clean-out panels 68 and 70 can be provided in both the separation chamber 44 and the blower housing 52.

In order to retain the compact nature of the machine 10, it will be appreciated that the blower housing 52 is of equal width with the hulling housing 14 and separation chamber 44. The blower assembly 54 consists of a shaft mounted impeller unit 72 which obtains air through a pair of screened opposed intakes 74 in the opposite vertical walls of the housing 52.

Figure 2:
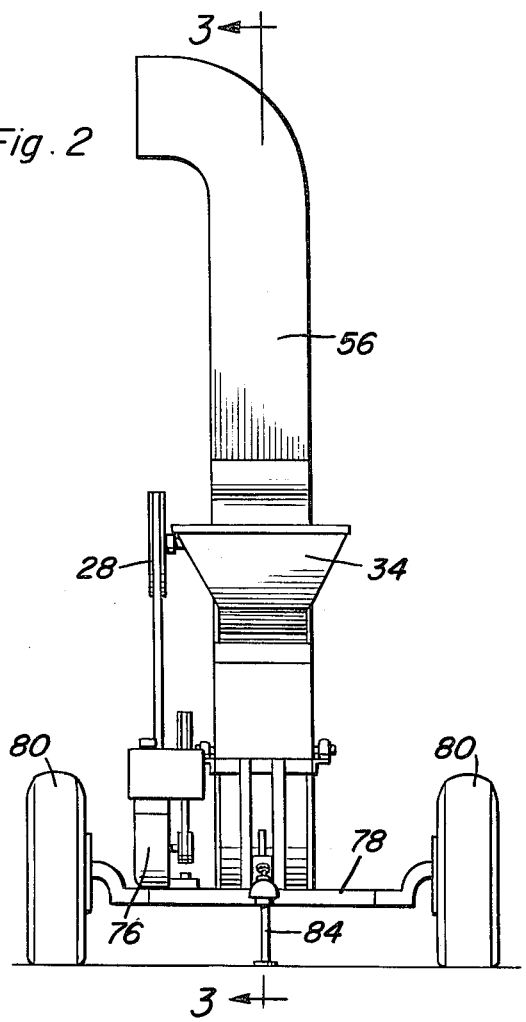
FIG. 2 is an end elevational view of the cleaner.
Figure 5:
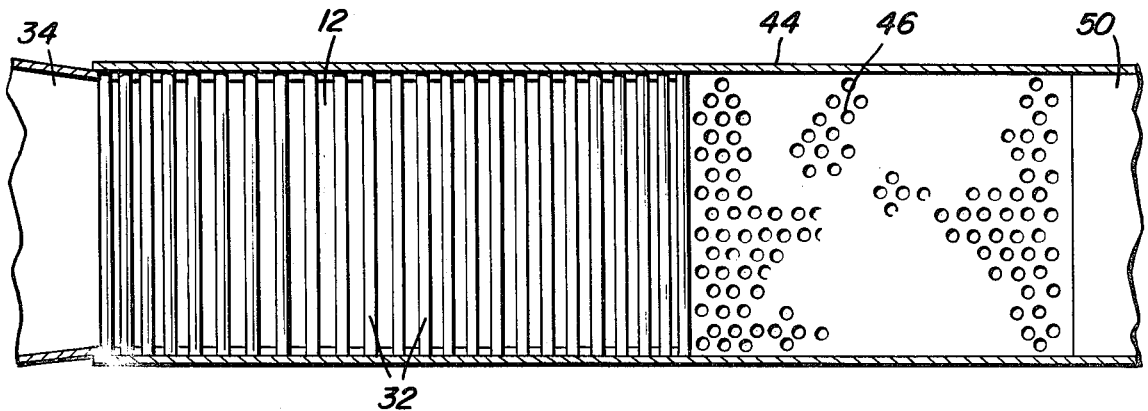
FIG. 5 is a horizontal cross-sectional view taken substantially on a plane passing along line 5—5 in FIG. 3.

With reference to FIGS. 1 and 2, an appropriate power plant 76 is utilized to drive the blower assembly shaft and the flail mounting drum through a series of belts and pulleys in an obvious manner.

The entire separation assembly is mounted on a mobile chassis including a rigid frame 78 including a pair of axle mounted wheels 80 at one end thereof and an appropriate towing or trailer hitch 82 at the second end thereof. An adjustable stabilizing standard 84 is also provided so as to maintain the assembly horizontal in operative position when disconnected from an appropriate towing vehicle.

In use, the machine 10 is positioned where desired, normally directly at the harvesting site. The harvested pecans, along with any debris which might be associated therewith depending upon the particular harvesting method, is introduced into the hulling chamber 12 by means of the inlet chute 34. The pecans and debris move through the hulling chamber 12 with the action of the flails, in conjunction with the grate bottom 32, effecting a positive yet gentle removal of the husks or hulls from the pecans with all of the material ultimately being discharged through the outlet 38 into the separation chamber. In the separation chamber, the lighter debris, husks, and the like are upwardly blown and separated from the normally heavier pecans which flow through the chamber to an outwardly directed discharge chute 50. This discharge chute 50 can, if so desired, incorporate hooks for the mounting of sacks or can lead directly to a grading table.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A pecan cleaner comprising a housing defining a closed hulling chamber, an inlet into said chamber for the introduction of pecans thereto, an outlet from the chamber for the discharge of pecans therefrom, pecan contacting and moving means operative in said chamber in cooperation with the housing to effect a hulling of introduced pecans, a separation chamber outward of the hulling chamber for reception of pecans and hulls from the hulling chamber through said outlet, and means in said separation chamber for separating the pecans from the hulls and other foreign matter, said pecan contacting and moving means comprising a rotating drum centrally within said housing, said drum including a plurality of radially projecting resilient flexible fingers thereabout, said fingers having a length greater than the distance between the drum and housing thereby being flexed and in dragging contact with the housing about the hulling chamber as the drum rotates, at least a portion of the housing being defined by a roughened area across which introduced pecans are moved by the fingers to effect a removal of the hulls therefrom wherein each of said fingers engages the housing and the roughened area therein over a substantial portion of its length, each finger being continuously flexible along the entire unsupported length thereof and including a plurality of nubs projecting therefrom along a major portion of the length thereof for assisting in gripping and turning pecans is they are dragged, rolled, and moved across the roughened area.

2. The structure as defined in claim 1 wherein said outlet is defined by a top edge spaced above the roughened area, the portion of the roughened area spaced from the top edge of the outlet diverging from the periphery of the drum for releasing the flexed fingers so that they will flex outwardly and strike the top edge of the outlet for injecting pecans into the separation chamber.

3. The structure as defined in claim 2 wherein said hulling chamber is generally cylindrical, said inlet into the chamber being defined by spaced top and bottom edges with the roughened area commencing at the bottom edge of the inlet, said flexed fingers being straightened by their resilient characteristics as they leave the top edge of the inlet with the release of the fingers causing a slapping action against the roughened area adjacent the inlet thereby assisting in the hulling of pecans.

4. The structure as defined in claim 3 wherein said separation chamber includes a discharge opening, said discharge opening being in opposed relation to the outlet from the hulling chamber, a perforated downwardly sloping bottom wall interconnecting the outlet from the hulling chamber and the discharge opening, a blower disposed below the perforated bottom wall and discharging air upwardly through the perforated bottom wall for separating and entraining lightweight debris, an elongated vertically disposed stack overlying the perforated bottom wall with one wall of the stack being spaced above the perforated wall and defining the discharge opening, said discharge opening being relatively narrow and at the lower end of the perforated wall whereby air passing up through the perforated wall and up through the stack will draw air in through the discharge opening to prevent discharge of lightweight debris or other material through the discharge opening.

* * * * *